United States Patent
Noe (10) Patent No.: US 6,661,936 B2
(45) Date of Patent: Dec. 9, 2003

(54) METHOD FOR CHARACTERIZING POLARIZATION TRANSFORMERS (75) Inventor: Reinhold Noe, Paderborn (DE)

(73) Assignee: Siemens Aktiengesellschaft (DE)

( * ) Notice: Subject to any disclaimer, the term of this patent is extended or adjusted under 35 U.S.C. 154(b) by 248 days.

(21) Appl. No.: 09/781,849

(22) Filed: Feb. 12, 2001

(65) Prior Publication Data

US 2001/0038486 A1 Nov. 8, 2001

(30) Foreign Application Priority Data

Feb. 11, 2000 (DE) .......................... 100 06 239

(51) Int. Cl.⁷ ................................................ G02B 6/00
(52) U.S. Cl. ........................ 385/11; 385/31; 359/499
(58) Field of Search ....................... 385/11, 31; 359/501, 359/499

(56) References Cited

U.S. PATENT DOCUMENTS

| 4,966,431 | A | * | 10/1990 | Heismann | 385/11 |
| 5,111,322 | A | * | 5/1992 | Bergano et al. | 385/24 |
| 5,212,743 | A | * | 5/1993 | Heismann | 385/11 |
| 5,311,346 | A | * | 5/1994 | Haas et al. | 398/146 |
| 5,361,270 | A | * | 11/1994 | Heismann | 385/11 |
| 5,930,414 | A | * | 7/1999 | Fishman et al. | 385/11 |
| 6,188,809 | B1 | * | 2/2001 | Bismuth et al. | 385/11 |
| 6,330,375 | B1 | * | 12/2001 | Fishman et al. | 385/11 |
| 6,417,948 | B1 | * | 7/2002 | Chowdhury et al. | 385/11 |
| 6,480,637 | B1 | * | 11/2002 | Yao | 385/11 |
| 6,493,473 | B1 | * | 12/2002 | Wooten | 385/11 |
| 2002/0015547 | A1 | * | 2/2002 | Patel | 385/11 |

* cited by examiner

Primary Examiner—Michael P. Stafira
Assistant Examiner—Juan D Valentin, II
(74) Attorney, Agent, or Firm—Bell, Boyd & Lloyd, LLC (57) ABSTRACT For characterizing polarization transformers or PMD compensators, a polarization transformer to be characterized is operated as a mode converter with full mode conversion and variable orientation. A polarization control sees to it that a further polarization transformer assures the desired, overall polarization transformation. Conclusions about the precision with which the polarization transformer to be characterized works can be drawn from the nature and strength or, too, from the absence of changes of control signals of this further polarization transformer, and this can be improved. The method is particularly suited for the automatic follow-up of DC drift in polarization transformers or PMD compensators with lithium niobate components.

24 Claims, 5 Drawing Sheets

METHOD FOR CHARACTERIZING POLARIZATION TRANSFORMERS

BACKGROUND OF THE INVENTION

1. Field of the Invention

The present invention is directed to a method for characterizing polarization transformers and, in particular, polarization transformers traversed by optical signals.

2. Description of the Related Art

International Patent Application PCT/DE 99/03875 discloses polarization transformers and compensators of polarization mode dispersion wherein redundant polarization setting elements that are not required for the actually desired function are utilized for generating control signals that are free of d.c. parts on chronological average. This serves the purpose of avoiding what is referred to as d.c. drift that makes the optical properties of polarization setting elements time-variant and, thus, unpredictable. Despite the described procedure it does not seem certain that d.c. drift can be thereby completely avoided. Moreover, polarization transformers are also subject to other modifications, for example temperature-dependent modifications, of their optical and electro-optical properties. If the properties of a polarization transformer that are present at the moment could be measured during operation, then unwanted variations such as d.c. drift could be neutralized by adapting parameters such as, for example, offset voltages.

In the reference IEEE J. Lightwave Techn. 6(1988)7, pp. 1199–1208, at pages 1205–1206 is disclosed a characterization method for electro-optical wave plates. This and other known characterization methods cannot be utilized during the operation of polarization transformers or PMD (Polarization Mode Dispersion) compensators. The reason for this is that specific operating parameters must be set for the characterization, so that the required degrees of freedom would no longer be available for the actual polarization transformation or PMD compensation. Bit errors due to faulty PMD compensation, for example, would thereby arise in the optical data transmission.

SUMMARY OF THE INVENTION

It is therefore an object of the invention to improve the d.c. drift suppression or other aging phenomena suppression in the form of a method for characterizing polarization transformers.

This object is achieved by a method for characterizing a polarization transformer that is traversed by an optical signal, including the steps of providing a first polarization transformer to be characterized and a further polarization transformer that lies before or after the first transformer in a light path of the optical signal and connected so that both are traversed by the optical signal, and, during the characterization of the first transformer, the further polarization transformer at least approximately assures the implementation of the desired polarization transformation or compensation of polarization mode dispersion of the optical signal.

Advantageous developments are provided by a method further providing that a plurality of polarization transformers are characterized by alternating characterization of one polarization transformer and implementation of a desired polarization transformation by this polarization transformer. Preferably, one polarization transformer acts as an elliptical retarder with a delay. At least a part of this polarization transformer acts as a mode converter with a selectable delay and selectable orientation, i.e. phase difference, between the converted and non-converted signals. In one embodiment, at least a part of this polarization transformer acts as a Soleil-Babinet analog with selectable delay and selectable orientation with mode conversion between the TE and TM modes. According to a development of the invention, at least a part of this polarization transformer acts as a Soleil-Babinet compensator with a selectable delay and selectable orientation with mode conversion between circular polarizations. A mode converter to be characterized may be operated with full mode conversion, i.e. a delay equal to an odd-numbered multiple of the value $\pi$ and variable orientation. A mode converter functionally following this mode converter to be characterized at least approximately experiences changes of its orientation that correspond to twice the change of the orientation of the mode converter to be characterized. A polarization transformer functionally preceding this mode converter to be characterized at least approximately experiences no change of its control parameters.

The polarization transformer to be characterized in an embodiment is operated with a delay equal to an even-numbered multiple of the value $2\pi$ and variable orientation. The polarization transformer to be characterized may be operated with variable delay. As a preferred development, changes of the polarization transformation of the optical signal caused by parameter variation of a polarization transformer to be characterized are detected by a detection means. Specifically, a change of other parameters of a polarization transformer to be characterized is undertaken as a function of an output signal of this detection means. This ensues for the purpose of minimizing an output signal of this detection means, or for the purpose of maximizing an output signal of this detection means. The output signal of this detection means can be supplied to a controller and another polarization transformer to at least approximately compensate these changes of the polarization transformation. A change of other parameters of a polarization transformer to be characterized is undertaken as a function of the change of parameters of a further polarization transformer. In a particular embodiment, this ensues for the purpose of minimizing the change of parameters of a further polarization transformer or, alternately, this ensues for the purpose of maximizing the change of parameters of a further polarization transformer.

A polarization transformer to be characterized is part of a polarization transformer that can generate a fixed polarization from every arbitrary polarization of the optical signal or serves for the receiver-side PMD compensation; and potentially existing polarization transformers functionally preceding the polarization transformer to be characterized lie in the beam path preceding the polarization transformer to be characterized, whereas potentially existing polarization transformers that functionally follow lie in the beam path behind the polarization transformer to be characterized.

A polarization transformer to be characterized is part of a polarization transformer that can generate any arbitrary polarization from a fixed polarization of the optical signal or serves for transmission-side PMD compensation; and potentially existing polarization transformers functionally preceding the polarization transformer to be characterized lie in the beam path following the polarization transformer to be characterized, whereas potentially existing polarization transformers that functionally follow lie in the beam path preceding the polarization transformer to be characterized.

In the method according to the invention, the first polarization transformer can be operated with voltages opposite those for the implementation of desired polarization transformation at times wherein the further polarization transformer at least approximately assures the implementation of the desired polarization transformation or compensation of polarization mode dispersion of the optical signal.

The solution of the problem is comprised in the characterization of polarization transformers or PMD compensators during their operation that are to be equipped with redundancy for this purpose. Some of the degrees of freedom thereby serve the desired control function, whereas some other, redundant degrees of freedom serve for the characterization. The architecture of the polarization transformer and the control voltages are selected such that the control function of the polarization transformer is not negatively affected.

In the inventive method, for example, a polarization transformer or PMD compensator is employed for normal control purposes and modifications of the desired polarization transformation during the characterization of a part of the polarization transformer are potentially intercepted by modifications of control parameters of other parts of the polarization transformer with the assistance of an adequately fast polarization control means. The size and direction or, too, the absence of these changes of control parameters is then a criterion for polarization transformations of the polarization transformer to be characterized. Alternatively thereto, the changes of the desired polarization transformation during the characterization of a part of the polarization transformer can be merely detected, particularly when the aim of the characterization is to minimize these changes. There are a great number of exemplary embodiments for this, but all of these work according to the same principle.

For example, a polarization transformer for the transformation of an arbitrary polarization in a fixed, linear polarization state in lithium niobate ($LiNbO_3$) with an X-section and a Z propagation direction can be composed of 8 cascaded electro-optical wave plates that can respectively assume a maximum delay of at least $\pi/2$. The first 4 wave plates work as a normal polarization transformer P1. The following 4 wave plates form a polarization transformer P2 that is characterized. To this end, those control voltages of the polarization transformer P2 are sought that allow an endless phase shift of a specific output polarization compared to the one orthogonal thereto. The search criterion is thereby that the control voltages applied to the wave plates of P1 for the desired polarization transformation—and, potentially, of further polarization transformers when employed as part of a PMD compensator—must be subject to only specific or optimally slight or even no changes. Subsequently, the transformers P1 and P2 interchange function, so that the transformer P1 is characterized and the transformer P2 undertakes the normal polarization transformation.

BRIEF DESCRIPTION OF THE DRAWINGS

The invention is explained in grater detail on the basis of exemplary embodiments.

DETAILED DESCRIPTION OF THE PREFERRED EMBODIMENTS

Figure 1:
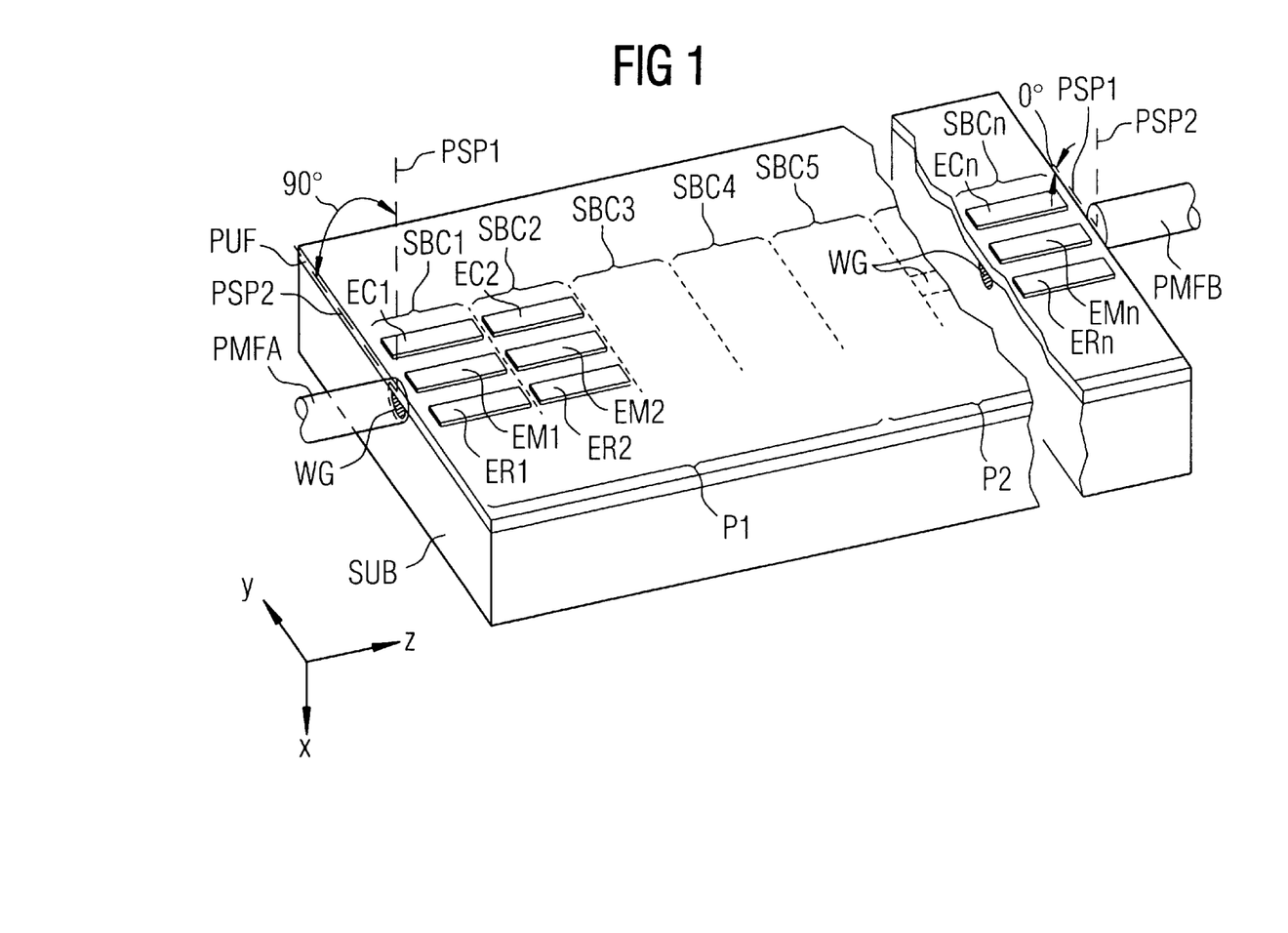
FIG. 1 is a top perspective view showing the fundamental structure of a polarization transformer in $LiNbO_3$ with an X-section and a Z propagation direction that is suitable for the application of the inventive method.

FIG. 1 shows a polarization transformer composed of a lithium niobate crystal with an X-section and a Z propagation direction. A waveguide WG was produced in the crystal SUB by drive-in of titanium. An insulating buffer layer PUF of, for example, silicon dioxide can but need not be applied on the crystal. Like the crystal, it is transparent at the operating wavelength.

Figure 2:
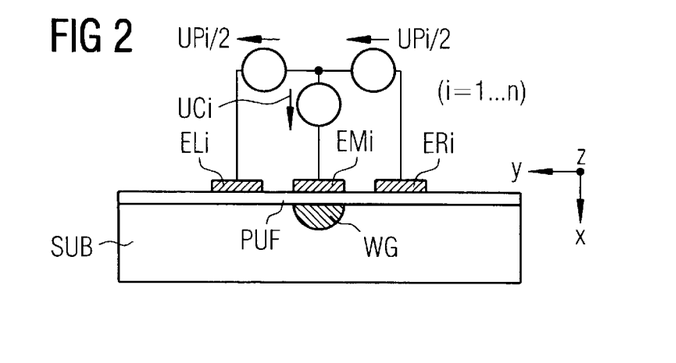
FIG. 2 shows a crossectional surface of the polarization transformer.

Conductive electrodes $EL_i$, $Em_i$ and $ER_i$ ($i=1 \ldots n$) are vapor-deposited on the buffer layer. Let $n=8$ apply here; however, other values are also possible. These electrodes can be composed of metal, for example aluminum, but can also be composed of transparent conductive materials such as indium-tin oxide (ITO). The electrodes $EL_i$, $Em_i$ and $ER_i$ are segmented so that, for example, $n=8$ polarization setting elements $SNC_i$ ($i=1 \ldots n$) are present. The middle electrodes $EM_i$ are located above the waveguide, left and right electrodes $El_i$ and $ER_i$ are applied parallel at both sides of the waveguides WG. Individual electrodes of various segments can also be connected to one another, for example all electrodes $EM_i$. By applying opposite voltages $UP_i$ ($i=1 \ldots n$) between the outer electrodes $ER_i$ and $EL_i$, a differential phase shift is produced between the transversal electrical (TE) and the transversal magnetic (TM) waves. Due to unavoidable waveguide birefringence, voltage values $UPi0$ of the voltages $UP_i$ that are different from zero are usually required in order to achieve phase matching, i.e. disappearing TE-TM phase shift. Instead of the Z propagation direction, other propagation directions can therefore also be selected, these approaching the Z-axis up to a few degrees, since the waveguide birefringence can thereby be approximately compensated with the assistance of the slightly birefringent crystal section. As a rule, voltage values $UPi0$ that are unequal to zero are nonetheless required for the phase matching because this matching is usually incomplete. When voltages $UC_i$ ($i=1 \ldots n$) that are identically directed relative to the middle electrode $EM_i$ are applied to the outer electrodes $EL_i$ and $ER_i$, then a TE-TM mode conversion is obtained. Given a disappearing voltage $UC_i$, the mode conversion is ideally equal to zero; however, even given a slight lateral shift of the electrodes in the Y-direction compared to the waveguide, a voltage $UCi0$ can be necessary for this purpose. By combining oppositely and identically directed voltages $UP_i$ and $UC_i$, any arbitrary combination of TE-TM phase shifting and TE-TM mode conversion can be achieved. Such a polarization setting element is also called an electro-optical Soleil-Babinet compensator SBC. The delay $\psi_i$ of the $SBC_i$ derives by geometrical addition of the TE-TM phase shift without mode conversion and the TE-TM mode conversion without phase shift, i.e. $\psi_i = \mathrm{sqrt}((bb*(UC_i - UCi0))^2 + (aa*(UP_i - UPi0))^2)$. Let the delay $\psi_i$ always be understood as positive below; negative delays are represented by positive with respect to transposed natural modes. The constants aa, bb are determined by overlap integrals between electrical and optical fields. An SBC acts as a linear optical wave plate of the delay $\psi$ with orthogonal, linearly polarized natural modes. The tangent of the double $\zeta$ of a physical elevation angle $\zeta/2$ of one of these natural modes is the ratio $(bb*(UCi-UCi0))/(aa*(UPi-UPi0))=\tan\zeta$. $\zeta$ can be referred to as an orientation angle $\zeta$ that characterizes the angular position of a natural mode on on the S1–S2 great circle (equator) of the Poincaré sphere. As already pointed out, UCi0 is equal to zero in the ideal case. As function of $\zeta$, an electro-optical wave plate with a delay $\psi$ and an orientation angle $\zeta$, requires cosine-shaped or, respectively, sine-shaped voltages $UPi=(\psi i/aa)*\cos\zeta+UPi0$, $UCi=(\psi i/bb)*\sin\zeta+UCi0$ of specific amplitudes ($\psi i/aa$) and ($\psi i/bb$) with offsets UPi0 and UCi0.

For the polarization transformation of a circular into any arbitrary polarization state or vice versa, an SBCi can comprise a delay $\psi i=0 \ldots \pi$, see the reference IEEE J. Lightwave Techn. 6(1988)7, pp. 1199–1207. A division of one SBC into several SBCs, whereby the adjustability of the sum of the delays is the same as the adjustability of the divided SBC, always likewise enables the desired polarization transformations. For the transformation of a circular into any arbitrary polarization state or vice versa, for example, two SBCs with delays of respectively $0 \ldots \pi/2$ can thus be employed. The SBC2 and SBC3 in FIG. 1 serve this purpose.

SBC1 and SBC4 work as quarter-wave plates with delays $\psi 1=\pi/2$ and $\psi 4=-\pi/2$. The orientation angles $\zeta 1$ and $\zeta 4$ amount to $\pm 90°$ (corresponding to physical elevation angles $\zeta 1/2$, $\zeta 4/2$ of $\pm 45°$), i.e. a pure TE-TM mode conversion respectively ensues when voltages $UC1-UC10\neq 0$, $UC4-UC40\neq 0$, $UP1=UP10$, $UP4=UP40$ are applied. This operating mode is directed thereto that the polarization-preserving light waveguides PMFA or, respectively, PMFB connected to the input side and output of the polarization transformer respectively have 0°/90° principal axes. In this operating mode, SBC1 . . . SBC4 form a polarization transformer P1, namely a TE-TM mode converter with a delay $\phi 1$ controllable at least between 0 and $\pi$ and a phase difference $\xi 1$ between a converted and a non-converted wave that are controllable infinitely between 0 and $2\pi$, that should also be referred to as an orientation angle $\xi 1$ by analogy to SBCs. In the reference IEEE J. Lightwave Techn., 17(1999)9, pp.1602–1616, such a polarization transformer is also referred to as a Soleil-Babinet analog (SBA). Dependent on whether $\zeta 1=\zeta 4$ or $\zeta 1=-\zeta 4$, whether $\zeta 1=90°$ or $\zeta 1=-90°$ applies, the SBA delay is $\phi 1=\psi 2+\psi 3$ or $\phi 1=\pi-\psi 2+\psi 3$, given the assumption $\zeta 2=\zeta 3$, and the SBA orientation is $\xi 1=\pm\zeta 2+C=\pm\zeta 3+C$, whereby C can be a constant of, for example, 0°, 90°, 180°, -90°.

The SBC1 . . . SBC4, however, can also be differently operated, for example as a general elliptical retarder (ER), whereby all 4 SBCs can have variable natural modes and, potentially, delays.

The SBC5 . . . SBC8, which together form a second polarization transformer P2, have the same functionality as SBC1 . . . SBC4, thus act as an SBA with a delay $\phi 2$ and an orientation $\xi 2$ or as an elliptical retarder ER.

Figure 3:
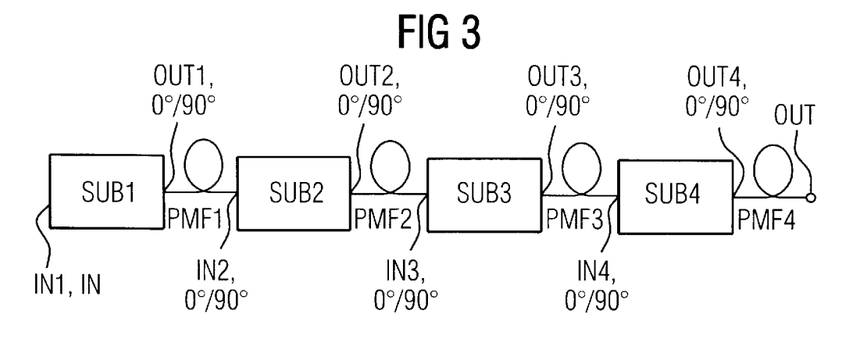
FIG. 3 is a functional block diagram of a plurality of such polarization transformers in a PMD compensator PMDC.

The polarization transformers P1 and P2 together on the substrate SUB form a redundant polarization transformer that is part of a receiver-side compensator of polarization mode dispersion (PMD), but can also be employed alone for the transformation of an arbitrary polarization state into a fixed linear polarization state. FIG. 3 shows such a PMD compensator with a plurality of such substrates SUB1 . . . SUB4 and polarization-preserving light waveguides PMF1 . . . PMF4 therebetween or, respectively, following thereupon with differential group running times and linearly polarized principal polarizations (principal states of polarization, PSP) proceeding at 0°/90° relative to the chip surfaces. The chip inputs are IN1 . . . IN4, the chip outputs are OUT1 . . . OUT4; at the same time, the chip input IN1 is the input In of the PMD compensator, the output OUT of the light waveguide PMF4 is the output of the PMD compensator.

Figure 6:
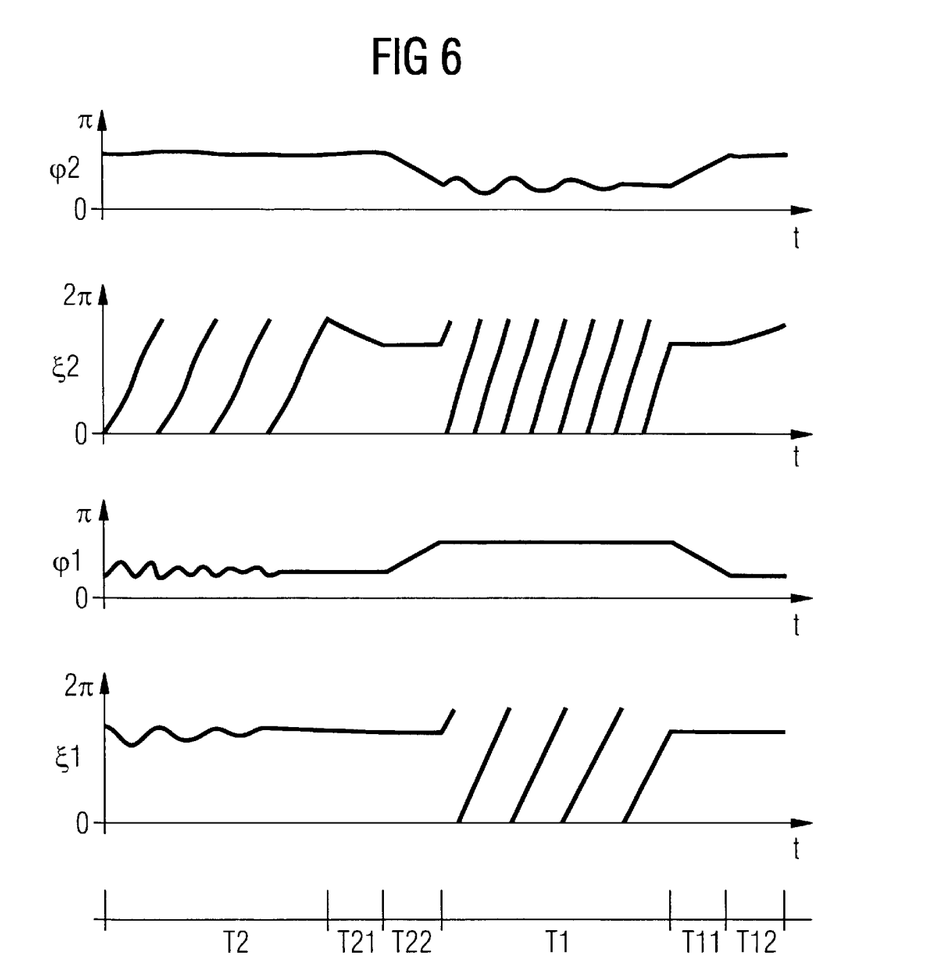
FIG. 6 shows time diagrams of delays and orientations in the implementation of the inventive method.

Inventively, the functionally preceding transformer P1 is first operated as a normal polarization transformer, whereas the transformer P2 that is redundant at this time is free of this task. This happens during the time span T2 that is shown in FIG. 6. The transformer P2 is operated as an SBA with a delay $\phi 2=\pi$ and an orientation $\xi 2$ that is variable between 0 and $2\pi$. For example, a change of $\xi 2$ that is linear as a function of the time requires cosine-shaped voltages UP6 and UP7 and sine-shaped voltages UC6 and UC7. The sawtooth curve of $\xi 2$ definitely corresponds to steady control voltages because of its periodicities. At the output of the substrate SUB, this generates a TE-TM phase shift $2\cdot\xi 2$ that is variable according to the double of the variable orientation $\xi 2$. As known from the publication IEEE J. Lightwave Techn., 17(1999)9, pp.1602–1616 and from International Patent Application POT/DE 99/03875, such a TE-TM phase shift can be tolerated in receiver-side PMD compensators when the orientations of the SBAs are correspondingly readjusted in functionally following, here, thus, in following polarization transformers. If transformers P1 and P2, for example, lie in substrate SUB2, the orientations of the SBAs in substrate SUB3 and SUB4 must be readjusted. Because of its delay $\phi 2=\pi$, the transformer P2 also acts a full mode converter, which, however, merely corresponds to a transposition of the terminal of the two principal axes of the following polarization-preserving light waveguide PMFB and can be easily taken into consideration. A change of the voltages at the functionally and—here—physically preceding transformer P1 is, ideally, not necessary given a change of the orientation $\xi 2$ of the transformer P2, and this fact can be utilized for the characterization of the transformer P2: When the transformer P2 is not driven exactly as described, the voltages of the transformer P1 must indeed be modified during the variation of the orientation $\xi 2$ as a function thereof, so that the desired, overall polarization transformation is not disturbed. Cosine or, respectively, sine amplitudes at SBC6 and SBC7 and appertaining offset voltages UP60, UP70, U060 and U070 as well as the voltages of the SBC5 and SBC8 working as constant-orientation quarter-wave plates are then varied such that optimally slight variations of the voltages at the transformer P1 are needed during the modulation of the elevation angle $\xi 2$ of the transformer P2. Phase differences between voltages UPi and UCi (i=6, 7) that deviate from 90° as well as different orientations of SBC6 and SBC7 are also possible. These can also be dependent on $\xi 2$. Likewise, cosine and sine amplitudes are possible that are functions of $\xi 2$, so that distorted, harmonic-containing cosine and sine voltages can arise. During this search event, the always existing polarization control must act on the transformer P1 and work clearly faster than corresponds to the modulation of the voltages at the transformer P2. So that the desired polarization transformation is not significantly disturbed, the changes of $\xi 2$ can, for example, be undertaken only in a small interval initially, i.e. while the drive of the transformer P2 really required therefor is not known exactly enough, before they are expanded onto the interval $0 \ldots 2\pi$. While the parameters of the transformer P2 are varied in the time span T2 for generating nominally identical functions $\phi 2=\pi$, $\xi 2=0 \ldots 2\pi$, the successful search diminishes the variations of the parameters $\phi 1$, $\xi 1$ of the transformer P1 that are thereby necessary.

After the end of this procedure, parameters or functions have been found with which the transformer P2 can be operated as a pure SBA with full mode conversion and freely selectable elevation angle, potentially accompanied by smaller, output-side TE-TM phase shifts that, however, can be taken into consideration with orientation angle changes in functionally following units, i.e. following SBAs here. By proportionally diminishing or enlarging the phase shift and conversion voltages (UPi-UPi0) or, respectively, (UCi-UCi0) (i=6, 7), the delay $\phi 2$ can be set with good precision down to the value 0 or beyond the value $\pi$. The calibration of the transformer P2 has thus been ended.

In a time span T21, the orientation angle $\xi 2$ of the transformer P2 is then selected such that it corresponds to the orientation angle $\xi 1$ of the transformer P1. If time span T2 is already ended such that $\xi 2=\xi 1$ applies, the time span T21 can be omitted. In this condition, the two SBAs P1, P2 can be interpreted as a single SBA with an overall delay $\phi 1+\phi 2$. Subsequently, in a time span T22, the delay $\phi 1$ of the transformer P2 is raised to $\pi$, whereas—simultaneously—the delay $\phi 2$ of the transformer P2 is lowered from the value $\pi$ to the value originally offered by the transformer P1. Since the overall delay $\phi 1+\phi 2$ thereby remains unmodified, the desired, overall polarization transformation is not disturbed. The orientation $\xi 1$ of the transformer P1 can now be changed; this ensues in the time span T1. At the same time, the orientation $\xi 2$ of the transformer P2, which is functionally subordinate to the transformer P1, can be modified by twice $2 \cdot \xi 1$ this modification, and the orientations of SBAs in further functionally subordinate, i.e. following polarization transformers here, are likewise modified by $2 \cdot \xi 1$. Insofar as one of these functionally following SBAs has the delay $\pi$, its orientation can instead be modified only by $\xi 1$; in this case, SBAs functionally following this SBA need no longer have their orientation changed. The orientation of a functionally following SBA with delay $\pi$ could also be changed by other angles; this would produce the necessity of also having to differently change the orientation of SBAs functionally following this SBA.

In addition, the transformer P2 still accomplishes the normal polarization control job. According to theory, the entire polarization transformation remains unchanged as a result of these changes, with the exception of a TE-TM phase delay of the size $2 \cdot \xi 1$ where SBA orientations must be modified by $2 \cdot \xi 1$ or of some other size where SBA orientations are modified by other quantities. A control system MP is again utilized that intercepts potential deviations from this case by readjusting $\phi 2$ and $\xi 2$ compared to the constant or, respectively, sawtooth curve in the transformer P2. For characterizing the transformer P1, the cosine and sine amplitudes at SBC2 and SBC3 and appertaining offset voltages UP20, UP30, UC20 and UC30 as well as all other variable parameters and functions cited in conjunction with the transformer P2 are modified analogous thereto in the transformer P1 such that optimally none of the deviations occur and need be intercepted. Here, too, smaller and smaller changes of the nominal values $\phi 2$ and $\xi 2$ compared to the curves are needed over the course of time T1. In this exemplary embodiment, the time span T1 ends just like it began, with the state $\xi 1=\xi 2$. During a following time span T11, $\phi 2$ is again raised to $\pi$, whereas $\phi 1$ is lowered to the same extent for the purpose of keeping the sum $\phi 1+\phi 2$ constant. Potentially, the orientation $\xi 2$ can be set to a value desired at the start of the time span T2 in a further time span T12. A time span T2 begins again after the end of the time span T12, etc.

Changes of the drive of the SBC1 during the time span T1 are in fact possible but yield no advantage. When, namely, the transformer P1 lies in the substrate SUB1, SBC1 is not needed anyway and can also be omitted since the receiver-side PMD compensator can process arbitrary input polarizations. When the transformer P1 lies in a functionally following substrate, i.e. lies in a substrate placed farther toward the back, for example substrate SUB2, then the parameters of SBC1 are preferably set for the purpose of least disturbance of the overall polarization transformation when a differential TE-TM phase modulation is already produced in front of it, i.e. in the substrate SUB1 here. In this way, the transformer P1 is also completely characterized, with the exception of SBC1 when the transformer P1 lies in the substrate SUB1.

It is also possible, moreover, to implement the actions of the time spans T22 and T12 in the state $\xi 1=\xi 2 \pm \pi$ instead of in the state $\xi 1=\xi 2$, whereby a single SBA with an orientation $\xi 1$ arises from the two SBAs P1 and P2, but with the overall delay $\phi 1-\phi 2$. In this case, it is not $\phi 1+\phi 2$ but $\phi 1-\phi 2$ that is to be kept constant. Since one of these delays should respectively reach the value $\pi$ during time T22 and T12, however, this approach is only meaningful in special instances wherein it has previously exceeded the value $\pi$.

As described, a functionally preceding polarization transformer and SBA P1 should be subject to no parameter changes insofar as possible during the variation of the elevation angle $\xi 2$ of the polarization transformer to be characterized and of SBA P2 with a delay $\phi 2=\pi$ when the transformer P2 is characterized well or perfectly. Functionally following polarization transformers, in contrast, must change their elevation angle by twice as much $2 \cdot \xi 1$ or, respectively, $2 \cdot \xi 1$ of this change of elevation angle while a polarization transformer to be characterized and SBA P1 or P2 is subjected to a change of its elevation angle $\xi 1$ or, respectively, $\xi 2$ with a delay $\pi$. In case of a receiver-side PMD compensator or of a polarization transformer that should convert an arbitrary input polarization into a fixed output polarization, functionally preceding or, respectively, following polarization transformers also precede or, respectively, follow in the light path, i.e. are traversed from front to back, and it is precisely this that was described farther above. In contrast, the situation is exactly opposite in the case of a polarization transformer that should generate an arbitrary output polarization from a fixed input polarization or in the case of a transmission-side PMD compensator: Functionally preceding polarization transformers follow in the light path, i.e. are traversed later, and functionally following polarization transformers precede in the light path, i.e. are traversed earlier.

Many variations of this inventive principle described with reference to the example of SBAs are possible. In addition to the aforementioned embodiment wherein—with the exception of differential TE-TM phase shifts—no further polarization changes should ideally be induced during the characterization, embodiments are also conceivable wherein intentional, other polarization changes are produced during the characterization. For example, the offset voltage UPi0 of an SBCi can be varied such that, when UCi–UCi0$\neq$0 (i=5 . . . 8) is applied in the transformer P2, the greatest possible mode conversion and, thus, greatest possible change of the required polarization transformation of transformer P1 derives. The voltage UCi0 of an SBCi can likewise be varied such that, when UPi–UPi0$\neq$0 (i=5 . . . 8) is applied in the transformer P2, a greatest possible TE-TM phase shift and, thus, a greatest possible need for change of the orientations derives for all SBAs lying therebehind and only separated therefrom by elements with the TE-TM phase shift.

In an extremely advantageous way, the invention can be combined with methods for avoiding DC drift that were disclosed in the International Patent Application PCT/DE 99/03875. In this case, one of the polarization transformers, for example P1 (or P2), always assumes the normal polarization control function. The other, i.e. transformer P2 (or, respectively, P1), is either characterized as described, or its control voltages are slowly shifted to the negative of the voltages required for normal polarization control operation or even beyond this in what is referred to as a reversing mode, so that the DC parts of the control voltages disappear on chronological average. During this shift of control voltages, too, the respective polarization transformer P1 (or, respectively, P2) running in normal mode and, potentially, polarization transformers lying in substrates following thereupon intercept the polarization changes induced as a result thereof, controlled by a polarization control. The method for avoiding the DC drift from the earlier patent application can even be modified such that potential residual drifts, for example of offset voltages UPi0 and UC10, that are detected with the inventive method can be compensated over the medium-term or long-term by greater or smaller control voltages of inverted polarities during the reversing mode.

Particularly when such a reversing mode with inverted polarities of control voltages is foregone, the above-described polarization transformer with SBC1 . . . SBC8 can be simplified. When, for example, the SBC4 and SBC5 were provided with opposite orientations $\zeta 5=-\zeta 4=90°$ and identical delays $\psi 4=\psi 45=\pi/2$, their effects cancel anyway, so that SBC4 and SBC5 can be omitted and only 6 SBCs are required. In the above nomenclature, for example, SBC2 and SBC3 can be combined into one SBC having a delay that is selectable at least up to $\pi$. The same is true of the original SBC6 and SBC7. In this way, a polarization transformer with only 4 SBCs is obtained, but with fewer variation possibilities of the polarization transformations. SBC1 can be omitted when the polarization transformer substrate SUB is the first, i.e. SUB1, in a PMD compensator. The same is true when the substrate SUB is employed to convert unknown polarization states of the input side into a linear polarization of the output side. When the desired polarization of the output side is circular or the PMD compensator contains elements of a differential group delay between circular polarizations, the original SBC8 of the output side can also be omitted. The original SBC8 can also be omitted when every arbitrary polarization state of the output side is to be generated from the linear input polarization. When this input polarization is circular, the SBC1 can also be omitted in turn. In this latter extreme case, the overall polarization transformer is composed of only 2 SBCs with a delay that is respectively selectable at least up to $\pi$ that correspond to the original SBC2 and SBC3 or, respectively, SBC6 and SBC7.

More complicated solutions that allow further variation possibilities of the polarization are possible with SBC pluralities of n>8.

When, given employment in PMD compensators, the polarization-preserving light waveguides PMFA and PMFB that serve the purpose of a differential delay are not connected to the chip inputs or, respectively, outputs at 0°/90° but at other angles, then this can be easily countered in that the orientation of the SBC1 or, respectively, SBC8 adjacent thereto is selected corresponding to twice the adjustment angle of PMFA, PMFB plus ±90°. In this way, the principal polarizations of PMFA continue to be reshaped by the SBC1 into circular polarizations, and circular polarizations continue to be reshaped by the SBC8 into principal polarizations of the PMFB. The orientations of the SBC4 and SBC5 can be advantageously modified. The analogous case applies when the substrate SUB is a polarization transformer that should transform or generate a linear polarization with elevation angles other than 0°/90°. Elliptical polarizations are also possible here by selecting delays other than $\pi/2$ for SBC1 or, respectively, SBC8 and, potentially, SBC4 and SBC5.

The inventive principle is also not limited to the functioning of the transformers P1 and P2 as SBAs. For example, the transformers P1 and P2 can also be respectively operated as elliptical retarders (ER). In the ideal case, a search of control parameters of the polarization transformers in the condition of a delay of 0 or $2\pi$ given arbitrary natural modes requires no variation of the polarization transformations of other polarization transformers for maintaining the same overall polarization transformation of a PMD compensator or polarization transformer. Control parameters of an elliptical retarder ER with a desired delay of 0 or $2\pi$ can therefore be selected such that such variations can be made optimally small and, ideally, zero. Intentional polarization changes of an elliptical retarder ER can also be produced and evaluated in terms of their effect on the basis of the changes in the control voltages at other polarization transformers required for their compensation.

Figure 4:
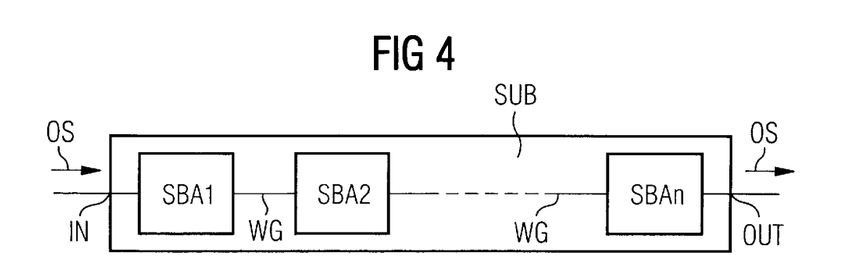
FIG. 4 is a block diagram of the fundamental structure of a polarization transformer in $LiNbO_3$ with an X-section and a Z propagation direction that is suitable for the application of the inventive method.
Figure 5:
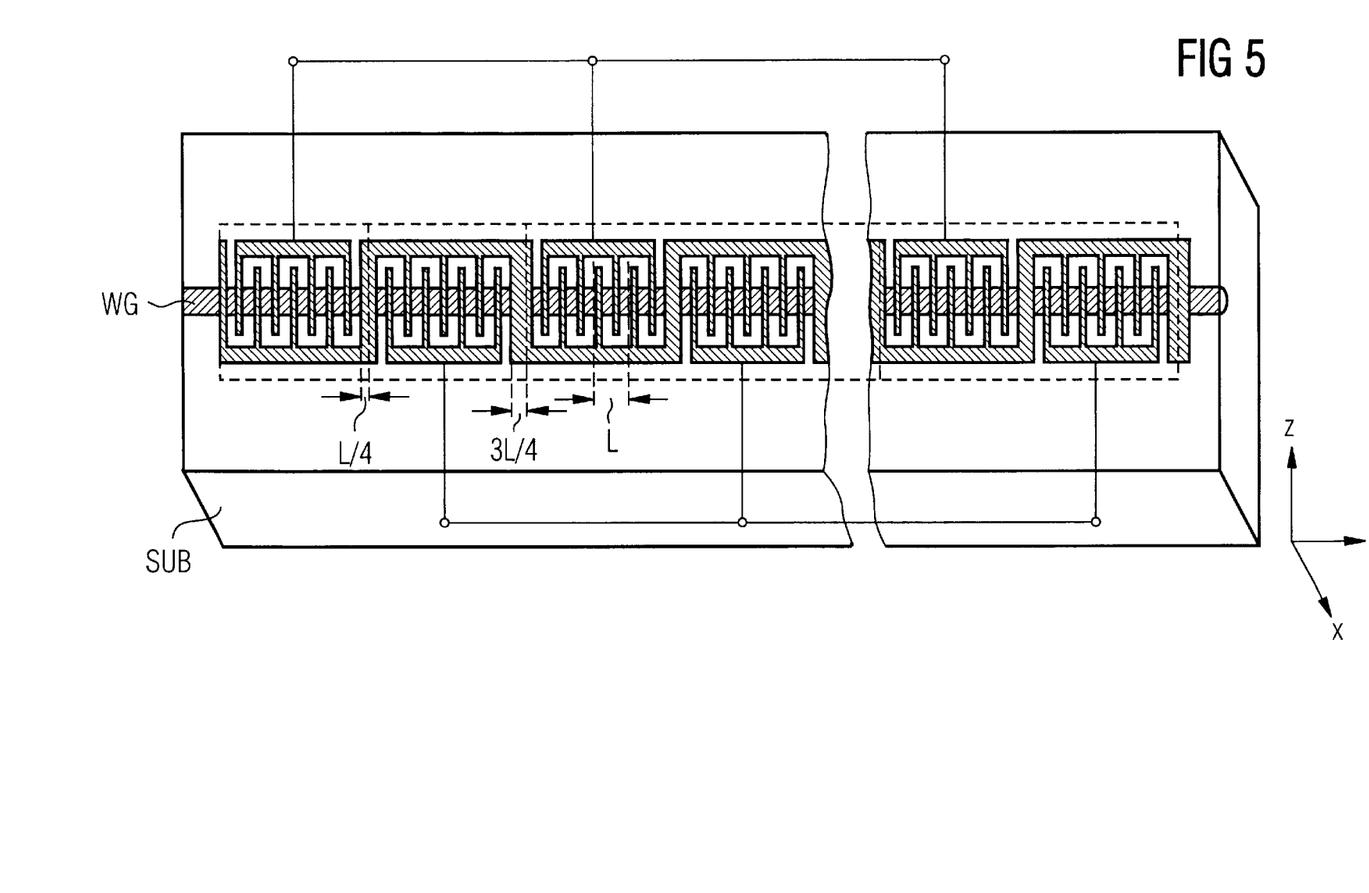
FIG. 5 is a tope isometric view of a detail from FIG. 4.

In other exemplary embodiments, the method is suited not only for the characterization of polarization transformers in LiNbO$_3$ with an X-section and a Z propagation direction. Polarization transformers and PMD compensators in LiNbO$_3$ with an X-section and a Y propagation direction can also be characterized; these are known, for example, from the publication Electronics Letters 35(1999)8, pp. 652–654. In FIG. 4, mode converters SBA1, SBA2, . . . SBAn are accommodated with comb electrodes on the chip SUB. These are also known from the publication IEEE J. Quantum Electronics 18(1982)4, pp. 767–771. Such an SBA is shown in detail in FIG. 5. As a result of different positions of different comb electrodes of an SBA with reference to neighboring comb electrodes, mode conversion in phase and in quadrature can be freely selected, so that SBAs are in fact realized. The already described embodiments of the method for SBAs are thus directly employable. The following version is likewise possible: The first SBA1 is operated with a delay $\pi$ and variable orientation. All following elements SBA2, SBA3, . . . SBAn must readjust their orientations by twice the change of the orientation of the first SBA1 in order to not disturb the polarization transformation implemented overall, with the exception of what is here an insignificant TE-TM phase shift that, however, can be intercepted by an SBA placed farther back, for example SBAn, that likewise has a delay $\pi$ and variable orientation. All SBA parameters including those of the SBA1 are then varied such that the variation of the orientation of P1 is not only optimally complete but is also intercepted in a way optimally corresponding to the physically anticipated laws. This means that given a change of the orientation of the SBA1 that is linear as a function of the time, all elements SBA1 . . . SBAn are operated with sine-shaped voltages, SBA 1 (and, if present, that intercepting the TE-TM phase shift—that was SBAn above) with single, all other SBAs lying therebetween with a double angular velocity. Other optimization criteria are also conceivable, for example optimally small amplitudes at the other SBAs for the interception of the polarization transformations of SBA1.

Of course, the method can also be utilized for characterizing other polarization transformers, for example those in lithium tantalate, III–V semiconductors, polymers or liquid crystals.

Figure 7:
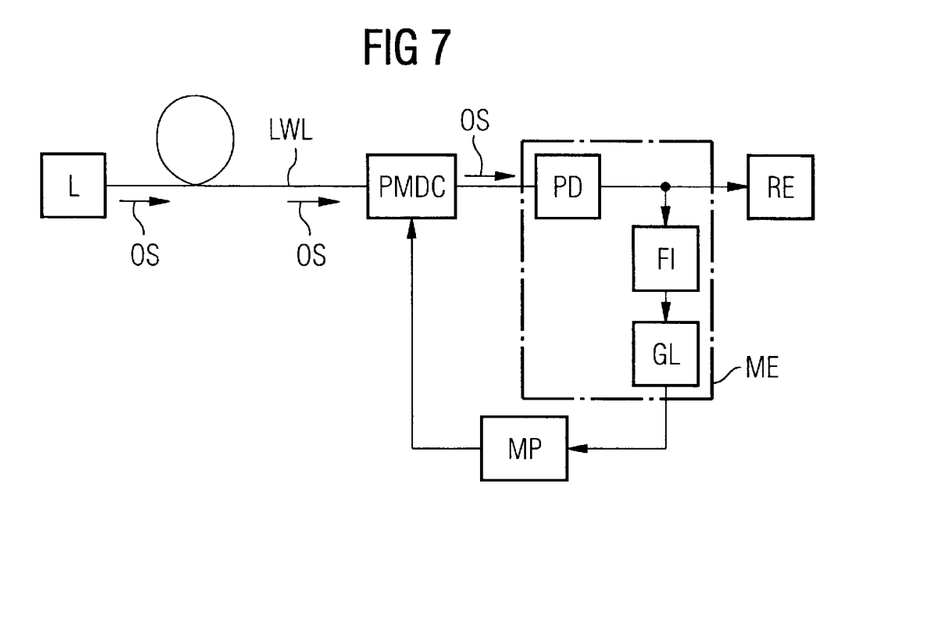
FIG. 7 is a functional block diagram showing the use of the inventive method in an optical receiver with a PMD compensator.

The use of the inventive method in an optical receiver with a PMD compensator PMDC that, for example, can be constructed as implemented in FIG. 3 or FIG. 4 is explained in FIG. 7. An optical transmitter L transmits an optical signal OS through a light waveguide LWL whose PMD is to be compensated. A following PMD compensator, i.e. a PMD compensator PMDC of the receiver side, serves this purpose. After passing through the PMDC, the optical signal is detected in a photodiode PD. Its output signal can be supplied to a regenerator RE, but is especially supplied to band-pass filters FI and following rectifiers GL. These detect spectral power densities in various frequency bands. Since the PMD principally deteriorates the high-frequency spectral parts of the baseband signal, PMD can be detected as a result thereof. Together, the photodiode PD, filter FI and rectifier GL form a measuring means ME. Their output signals are connected to a controller MP that in turn controls the PMDC. When the compensator PMDC and the waveguide LWL are transposed in the light path of the optical signal OS, then it is a matter of a PMD compensator of the transmission side.

Figure 8:
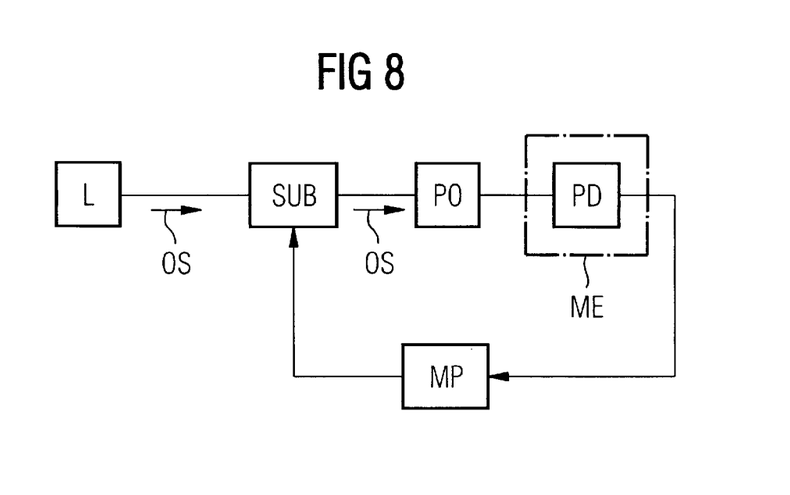
FIG. 8 is a functional block diagram showing the use of the inventive method in a polarization transformer with a fixed input polarization.

The use of the inventive method is also possible in the arrangement of FIG. 8. Here, the optical signal OS of a laser L with, for example, a horizontal polarization is supplied to the polarization transformer SUB. A variable polarizer PO is situated at its output, followed by a photodiode PD that forms the measuring means ME. The controller MP for controlling the substrate SUB is again connected thereto. In FIG. 8, for example, the substrate SUB is always regulated such that maximum (or, optionally, minimum) photocurrent flows in the photodetector PD regardless of the position of the polarizer PO.

What is critical in the implementation of the method is that the regular, desired, overall polarization transformation of the polarization transformer or PMD compensator remains at least approximately unvaried in all aspects that are critical therefor. Since the existing control speed of a polarization regulator MP or of a control means for PMD compensation MP would normally wish to be employed as completely as possible for intercepting natural polarization changes of PMD changes of an optical transmission link, it is beneficial in practice to implement the variations of the control parameters of polarization transformers to be characterized only comparatively slowly and, insofar as their innocuousness has not yet been adequately proven, only with low amplitude as warranted. Changes of the parameters of non-characterized polarization transformers that are conditioned by the parameter change at the polarization transformer to be characterized thereby superimpose with those that are caused by natural polarization changes or PMD changes. A longer averaging of the measured results is therefore expedient before specific parameters of the polarization transformer to be characterized are considered more correct than the previously known estimated values of these parameters. However, such a longer averaging is no impediment in practice since changes of the parameters of polarization transformers only derive very slowly. What is referred to as the DC drift in $LiNbO_3$ usually has time constants ranging from days to years and these time constant can get larger given a combination with drift reduction methods by applying control voltages that are free of DC parts over the long term.

Alternatively to the above-described detection method of polarization transformation changes of a polarization transformer to be characterized, it is also possible to not level these changes but to only detect them in the detection means ME. The changes, however, must then be so small that they do not yet significantly disturb the normal polarization control function. Embodiments are therefore especially beneficial wherein the characterization aims at a disappearance of these changes. In the above-described example of a PMD compensator of FIG. 2 with polarization transformers of FIG. 1, for example, the transformer P2 of a specific substrate, for example SUB2, was, for the purpose of characterization as an SBA, operated with a delay $\pi$ and linearly variable orientation as a function of the time. The orientation angles of all following SBAs, i.e. in SUB3 and SUB4, received linearly variable orientations (as function of the time) with twice the angular velocity. The frequency parts of the detection signals that are caused by this modulation are then minimized by parameter variation in the detection means ME of an optical receiver that detects PMD. When they completely disappear, then transformer P2 of SUB2 in fact acts as wanted and has thus been characterized. Given this type of detection, the angular velocity should preferably not lie in frequency ranges wherein the natural polarization changes are very strong. Frequencies of, for example, 1 kHz through 10 MHz wherein natural polarization changes hardly occur are therefore especially suitable.

Although other modifications and changes may be suggested by those skilled in the art, it is the intention of the inventor to embody within the patent warranted hereon all changes and modifications as reasonably and properly come within the scope of their contribution to the art.

I claim:

1. A method for characterizing a polarization transformer, which is traversed by an optical signal, with a control function, said method comprising the steps of:

providing a first polarization transformer to be characterized;

providing a further polarization transformer that lies before or after the first polarization transformer in a light path of the optical signal and connected to said first polarization transformer, both said first polarization transformer and said further polarization transformer being traversed by the optical signal;

performing a characterization of the first polarization transformer during implementation of one of polarization transformation and compensation of polarization mode dispersion of the optical signal by said further polarization transformer so that the control function is not negatively affected.

2. A method as claimed in claim 1, further comprising the step of:

characterizing a plurality of polarization transformers by alternating characterization of one polarization transformer and implementing a desired polarization transformation by the one polarization transformer.

3. A method as claimed in claim 1, wherein one of said first polarization transformer and said further polarization transformer acts as an elliptical retarder with a delay.

4. A method as claimed in claim 1, wherein at least a part of one of said first polarization transformer and said further polarization transformer acts as a mode converter with selectable delay and selectable orientation.

5. A method as claimed in claim 4, wherein said selectable delay and said selectable orientation provide a phase difference between converted and non-converted signals.

6. A method as claimed in claim 4, wherein at least a part of one of said first polarization transformer and said further polarization transformer acts as a Soleil-Babinet analog with said selectable delay and said selectable orientation with mode conversion between TE and TM modes.

7. A method as claimed in claim 4, wherein at least a part of one of said first polarization transformer and said further polarization transformer acts as a Soleil-Babinet compensator with said selectable delay and said selectable orientation with mode conversion between circular polarizations.

8. A method as claimed in claim 4, further comprising the step of:

operating the mode converter to be characterized with full mode conversion.

9. A method as claimed in claim 8, wherein the full mode conversion includes a delay equal to an odd-numbered multiple of the value $\pi$ and variable orientation.

10. A method as claimed in claim 8, further comprising the step of:

providing a further mode converter functionally following the mode converter to be characterized, the further mode converter experiencing changes of its orientation that correspond to approximately twice a change of the orientation of the mode converter to be characterized.

11. A method as claimed in claim 8, further comprising the step of:

providing a polarization transformer functionally preceding the mode converter to be characterized, the polarization transformer experiencing no substantial change of its control parameters.

12. A method as claimed in claim 1, further comprising the step of:

operating the polarization transformer to be characterized with a delay equal to an even-numbered multiple of the value $2\pi$ and a variable orientation.

13. A method as claimed in claim 1, further comprising the step of:

operating the polarization transformer to be characterized with a variable delay.

14. A method as claimed in claim 1, further comprising the step of:

detecting changes of polarization transformation of the optical signal caused by parameter variation of the polarization transformer to be characterized.

15. A method as claimed in claim 14, further comprising the step of:

changing other parameters of the polarization transformer to be characterized as a function of an output signal of said detecting step.

16. A method as claimed in claim 15, wherein said changing ensues for a purpose of minimizing an output signal in said detecting step.

17. A method as claimed in claim 15, wherein said changing ensues for a purpose of maximizing an output signal in said detecting step.

18. A method as claimed in claim 14, further comprising the steps of:

supplying an output signal of said detecting step to a controller; and at least partially compensating by another polarization transformer for changes of the polarization transformation.

19. A method as claimed in claim 18, further comprising the step of:

undertaking a change of other parameters of the polarization transformer to be characterized as a function of the change of parameters of said further polarization transformer.

20. A method as claimed in claim 19, wherein said step of undertaking ensues for minimizing the change of parameters of said further polarization transformer.

21. A method as claimed in claim 19, wherein said step of undertaking ensues for maximizing the change of parameters of said further polarization transformer.

22. A method as claimed in claim 1, wherein the polarization transformer to be characterized is part of a polarization transformer that one of:

generates a fixed polarization from every arbitrary polarization of the optical signal, and serves for receiver-side PMD compensation; and further comprising the steps of:

providing polarization transformers functionally preceding the polarization transformer to be characterized in a beam path preceding the polarization transformer to be characterized; and providing polarization transformers that functionally follow in the beam path behind the polarization transformer to be characterized.

23. A method as claimed in claim 1, wherein the polarization transformer to be characterized is part of a polarization transformer that one of:

generates any arbitrary polarization from a fixed polarization of the optical signal; and serves for transmission-side PMD compensation; and further comprising the steps of:

providing polarization transformers functionally preceding the polarization transformer to be characterized in the beam path following the polarization transformer to be characterized; and providing polarization transformers that functionally follow in the beam path preceding the polarization transformer to be characterized.

24. A method as claimed in claim 1, further comprising the step of:

operating the first polarization transformer with voltages opposite those for an implementation of desired polarization transformation at times wherein the further polarization transformer at least approximately assures implementation of the desired polarization transformation or compensation of polarization mode dispersion of the optical signal.

* * * * *